US012663101B2

(12) United States Patent
Mordau

(10) Patent No.: US 12,663,101 B2
(45) Date of Patent: Jun. 23, 2026

(54) DEVICE FOR ROUTING LINES, PIPES, AND/OR CABLES THROUGH A BUILDING STRUCTURE PART

(71) Applicant: Hilti Aktiengesellschaft, Schaan (LI)

(72) Inventor: Ulf Mordau, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 176 days.

(21) Appl. No.: 18/250,671

(22) PCT Filed: Oct. 18, 2021

(86) PCT No.: PCT/EP2021/078735
§ 371 (c)(1),
(2) Date: Apr. 26, 2023

(87) PCT Pub. No.: WO2022/089967
PCT Pub. Date: May 5, 2022

(65) Prior Publication Data
US 2023/0407996 A1      Dec. 21, 2023

(30) Foreign Application Priority Data
Oct. 28, 2020      (EP) .................................... 20204255

(51) Int. Cl.
*F16L 5/14*          (2006.01)
*A62C 2/06*        (2006.01)
*F16L 5/04*          (2006.01)
(52) U.S. Cl.
CPC    *F16L 5/14* (2013.01); *A62C 2/06* (2013.01);
*F16L 5/04* (2013.01)
(58) Field of Classification Search
CPC .................. F16L 5/04; F16L 5/14; A62C 2/06
See application file for complete search history.

(56) References Cited

U.S. PATENT DOCUMENTS 7,507,912 B1 *    3/2009  Sempliner ................ H02G 3/22
174/152 G
10,143,868 B2 *  12/2018  Lopes ........................ F16L 5/04
(Continued)

FOREIGN PATENT DOCUMENTS

CA          2823230 C  *  4/2019  ................ F16L 5/04
DE          2829887          1/1980
(Continued)

OTHER PUBLICATIONS

International Search report issued Jan. 26, 2022, in PCT/EP2021/078735, 5 pages including English translation.
(Continued)

*Primary Examiner* — Eugene G Byrd
(74) *Attorney, Agent, or Firm* — Grüneberg Global IP, PLLC

(57) ABSTRACT

A device for routing lines, pipes, and/or cables through a building part, contains a housing having a housing wall. The housing has an axial passage channel that is delimited by the housing wall and extends in the longitudinal direction, and has in each case an opening at opposite ends. At least two sealing arrangements are each provided in the housing interior, are designed for sealing the passage channel, and form a sealing surface. A first sealing surface has a plurality of sealing elements which are elongated, extend in a first main direction, and are adjacent to one another. A second sealing surface has a plurality of sealing elements that are elongated, extend in a second main direction, and are adjacent to one another. The first main direction and the second main direction differ from one another with respect to a transverse plane perpendicular to the longitudinal direction.

20 Claims, 4 Drawing Sheets

(56)                       References Cited

U.S. PATENT DOCUMENTS

| | | | | |
|---|---|---|---|---|
| 2016/0273682 A1* | 9/2016 | Paetow | .................... | H02G 3/22 |
| 2017/0241572 A1* | 8/2017 | Muenzenberger | ....... | H02G 3/22 |
| 2018/0264298 A1* | 9/2018 | Lopes | ....................... | E04B 1/94 |
| 2020/0041045 A1 | 2/2020 | Simon et al. | | |
| 2022/0112971 A1 | 4/2022 | Simon et al. | | |

FOREIGN PATENT DOCUMENTS

| | | | | | |
|---|---|---|---|---|---|
| DE | 102008000420 A1 * | 9/2009 | .......... | E04G | 15/061 |
| DE | 102011105575 B3 * | 9/2012 | ............. | A62C | 2/065 |
| EP | 3150891 A1 * | 4/2017 | ............. | E04B | 1/36 |
| EP | 3150894 A1 * | 4/2017 | ............. | F16L | 5/025 |
| EP | 3 306 158 | 4/2018 | | | |
| WO | WO-03023922 A2 * | 3/2003 | ........ | E04F | 15/02405 |

OTHER PUBLICATIONS

Written Opinion issued Jan. 26, 2022, in PCT/EP2021/078735, 7 pages including English translation.

\* cited by examiner

DEVICE FOR ROUTING LINES, PIPES, AND/OR CABLES THROUGH A BUILDING STRUCTURE PART

CROSS-REFERENCE TO RELATED APPLICATIONS

This application is the National Stage entry under § 371 of International Application No. PCT/EP2021/078735, filed on Oct. 18, 2021, and which claims the benefit of priority to European Application No. 20204255.2, filed on Oct. 28, 2020. The content of each of these applications is hereby incorporated by reference in its entirety.

BACKGROUND OF THE INVENTION

Field of the Invention

The invention relates to devices for routing lines, pipes, and/or cables through building structure parts, such as building walls and the like, and to features for preventing passage of fire gases and smoke through such a device and for ensuring an optical seal by the device.

Description of Related Art

Known devices for routing lines, pipes, and/or cables through building structure parts usually have features to achieve a desired smoke impermeability, fire gas impermeability, and optical seal or opaqueness. For this purpose, it is known, for example, to use brush curtains or loop curtains. The criterion of opaqueness plays an important role in assessing a regular installation.

From publication U.S. Pat. No. 8,869,475 B2, a line routing for a building element is known that, for providing impermeability against fire gases and smoke, has a lamella curtain of loop-like lamellas which are in contact with a line routed through them. However, in particular in the case of lines having round cross sections, a curtain made of such lamellas cannot ensure the desired impermeability against the penetration of fire gases and smoke and also cannot ensure the desired opaqueness.

It is also known to use two opposing rows of brushes as a sealing arrangement, the bristles of which may penetrate one another. A solution is known from U.S. Pat. No. 10,363,444 A1 in which brushes arranged on one side are arranged in an X-shape to one another in the longitudinal direction of the device, so that one brush bristles of one brush intersect with the brush bristles of the other brush. However, in the case of this embodiment, too, a desired impermeability against the penetration of fire gases and smoke and also an opaqueness in the case of lines or the like routed through the device cannot be achieved to the desired extent.

It is the object of the present invention to provide an improved device for routing lines, pipes, and/or cables through a building part, in which device the impermeability of the device is improved.

SUMMARY OF THE INVENTION

This object is achieved by the device for routing lines, pipes, and/or cables as described below.

Further embodiments are also specified in the description.

According to one aspect, a device for routing lines, pipes, and/or cables through a building part is provided, comprising a housing having a housing wall, wherein the housing has an axial passage channel that is delimited by the housing wall and extends in the longitudinal direction and has in each case one opening at opposite ends, wherein at least two sealing arrangements are each provided in the housing interior, are designed for sealing the passage channel, and form a sealing surface, wherein the first sealing surface has a plurality of first sealing element that are elongated, extend in a first main direction, and are adjacent to one another. It is provided that the second sealing surface has a plurality of second sealing element that are elongated, extend in a second main direction, and are adjacent to one another, wherein the first main direction and the second main direction differ from one another with respect to a transverse plane perpendicular to the longitudinal direction.

The present solution has the advantage that opaqueness and, in particular, impermeability to fire gases and smoke is improved compared to known designs. When loading the device, i.e. routing lines, pipes, cables, or the like through the device, a lens-shaped arrangement of the sealing elements is set around the load. Due to the differing main directions of the at least two sealing arrangements, the lens-shaped arrangements of the sealing elements of the two sealing arrangements are arranged in a rotated manner with respect to one another during loading, so that, viewed in the longitudinal direction of the device, a cross section uncovered by both sealing arrangements in addition to the loading is clearly reduced compared to known designs with sealing arrangements without rotated main directions. As a result, the opaqueness, i.e. a cross section which is uncovered when viewed in the longitudinal direction of the device and which is not covered by the line and the sealing elements, is improved and an improved impermeability against fire gases and smoke is achieved.

A main direction is understood in this case to mean that direction of extension of the sealing elements, in the direction of which the sealing element extend from a first end to a second end without loading the device, i.e. without any lines, cables, or the like routed through the device.

It is preferably provided that the sealing elements of a sealing surface completely close the cross section of the passage channel without loading the device.

In an advantageous embodiment, it is provided that the first main direction and the second main direction together enclose an angle between 10 degrees and 170 degrees, preferably between 40 degrees and 140 degrees, more preferably between 70 degrees and 110 degrees, and in particular substantially 90 degrees with respect to the transverse plane perpendicular to the longitudinal direction. The closer the angle enclosed by the main directions approaches 90°, the better the opaqueness, smoke impermeability, and fire gas impermeability achieved, since the lens effects present when loading the device complement each other particularly favorably.

In a structurally simple embodiment, the first sealing surface and/or the second sealing surface are each substantially one sealing plane and are therefore designed to be planar.

A simple embodiment of the device provides that the first sealing plane and/or the second sealing plane is arranged substantially perpendicular to the longitudinal direction.

It can be provided that the first sealing plane and/or the second sealing plane have an angle with respect to the longitudinal direction. In particular, this facilitates routing of a line, a pipe, a cable, or the like through the device.

The first sealing plane and the second sealing plane are particularly preferably arranged substantially parallel to one another, but it can also be provided that the first sealing plane encloses an angle with the second sealing plane.

Particularly good opaqueness can be achieved if two sealing arrangements are arranged in the region of one end of the housing, and if there is as little distance as possible in the longitudinal direction of the device between the sealing arrangements. Two sealing arrangements are preferably also arranged at the other end of the housing. The opaqueness can hereby be further improved.

At least one sealing arrangement can have at least two sealing structures, wherein at least one of the sealing structures, preferably both sealing structures, each have a plurality of sealing elements which are elongated, extend in the corresponding main direction, and are adjacent to one another. The sealing elements are preferably designed to be resiliently deformable. As an alternative thereto, sealing elements can also be provided with, in particular, a plurality of partial regions interconnected via joints.

A particularly good seal in the region of a sealing arrangement can be achieved if the sealing elements of the two sealing structures substantially form a common sealing line, and if the sealing elements of one sealing structure rest preferably against sealing elements of the other sealing structure. Sealing elements of a sealing structure are preferably each connected to one side of the housing and in particular have a substantially comparable length in the main direction, wherein ends of the sealing elements facing away from the housing preferably stand on ends of the sealing elements of the other sealing structure facing away from the housing.

As an alternative thereto, it can also be provided that the sealing elements of the two sealing structures do not form a continuous sealing line and, for example, sealing elements of a sealing structure have lengths that differ from one another in the corresponding main direction. Lengths of the sealing elements of a sealing structure can, for example, be made alternately longer and shorter and interact with oppositely designed sealing elements of the other sealing structure and, for example, intermesh in a comb-like manner at least in the unloaded state of the device.

It can also be provided that sealing elements of the one sealing structure and sealing elements of the other sealing structure penetrate one another, and thus, in the main direction, sealing elements of one sealing structure have an overlap region with sealing elements of the other sealing structure in the unloaded state of the device or are at least partially arranged next to one another.

It can be provided that sealing elements of a sealing arrangement are arranged on both sides of the housing wall. In order to allow the loading of the device as desired, the sealing elements are designed with a defined resilience.

The sealing elements can be designed as lamellas, brushes, bristles, strips, tapes, hose elements, or the like, the sealing elements preferably being designed to be flexible and/or resilient. A width of the sealing elements is preferably many times smaller than a length of the sealing elements in the main direction and preferably also many times smaller than lines, pipes, cables or the like routed through the device.

The sealing elements can be made of metal, plastics material, rubber, for example natural rubber or EPDM, biological materials such as horse hair and/or pig bristles. The sealing elements preferably have plastics fibers made of polypropylene and/or polyethylene.

To connect the sealing elements to the housing, at least one sealing structure or at least one sealing arrangement can have at least one connecting element to which the corresponding sealing elements are connected. The connecting element can in turn be inserted or clipped into the housing wall. The at least one connecting element can be designed, for example, as a rail that can be pushed into a corresponding recess in the housing.

As an alternative thereto, it can also be provided that the sealing elements of a sealing arrangement are connected directly to the housing wall. For this purpose, for example, a plurality of sealing elements can be interconnected via a clip and arranged in a hole in the housing by means of a mandrel.

The housing of the device preferably has a substantially constant cross section in the longitudinal direction, wherein the housing can have a circular, oval, rectangular, square, or polygonal cross-sectional surface.

In order to allow simple assembly of the device, the housing can be designed in two parts at least in the longitudinal plane, the parts of the device in particular being able to be arranged reversibly next to one another. It can be provided in this case that sealing arrangements and/or sealing structures are assigned to one or both parts of the housing and are fastened to one or both parts of the housing.

It can be provided that at least one sealing arrangement and/or a sealing structure has an intumescent material, wherein in particular the sealing elements can be made with an intumescent material or can have an element made with an intumescent material. This makes it possible to ensure in a simple manner that the passage channel is closed in the event of a fire.

BRIEF DESCRIPTION OF THE DRAWINGS

Embodiments will be explained in more detail hereinafter on the basis of the accompanying drawings, in which.

DETAILED DESCRIPTION OF THE INVENTION

FIG. 1 to FIG. 5 and FIG. 8 show a device 1 for routing one or more lines, pipes, cables, or the like, such as power lines, water lines, gas lines, and the like, through a building part, such as, for example a building wall, a ceiling, and a floor.

Figure 1:
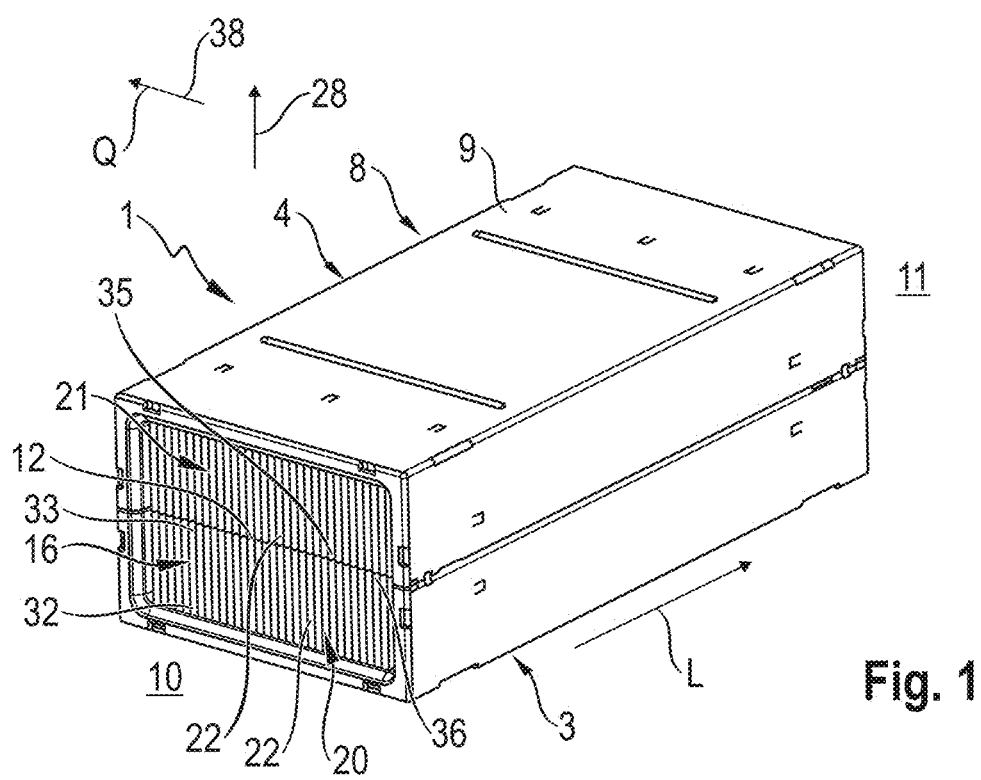
FIG. 1 is a perspective view of a device for routing lines, pipes, and/or cables through a building part having a passage channel, the device being designed having two parts that can be brought into operative connection with one another.
Figure 2:
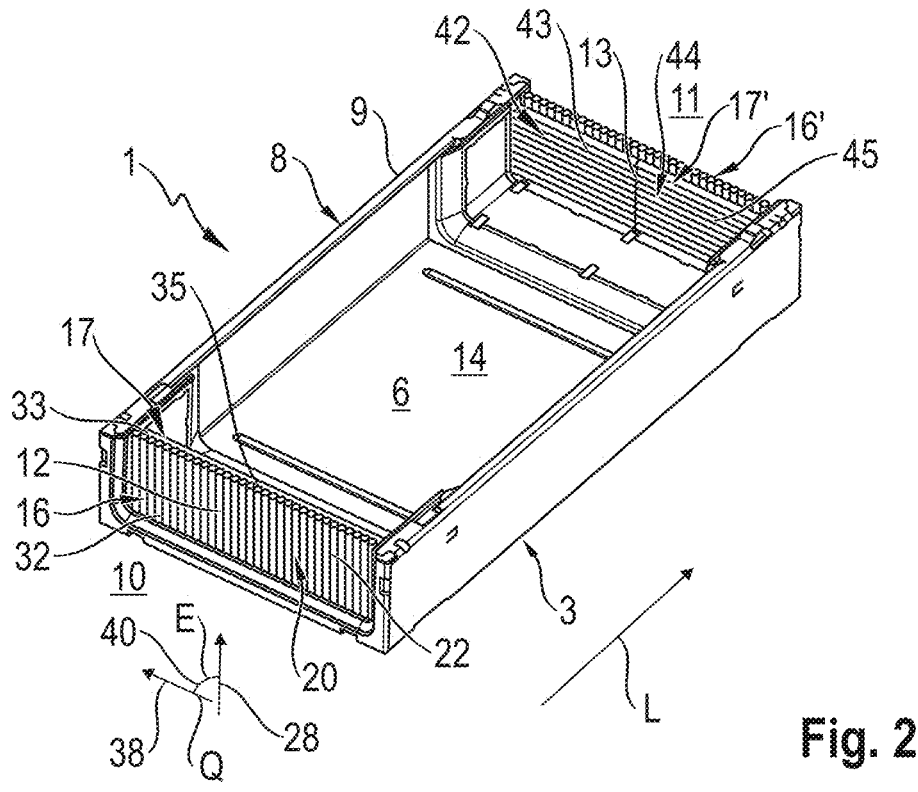
FIG. 2 is a three-dimensional view of a part of the device according to FIG. 1, two sealing arrangements being provided in each end region of the passage channel.
Figure 3:
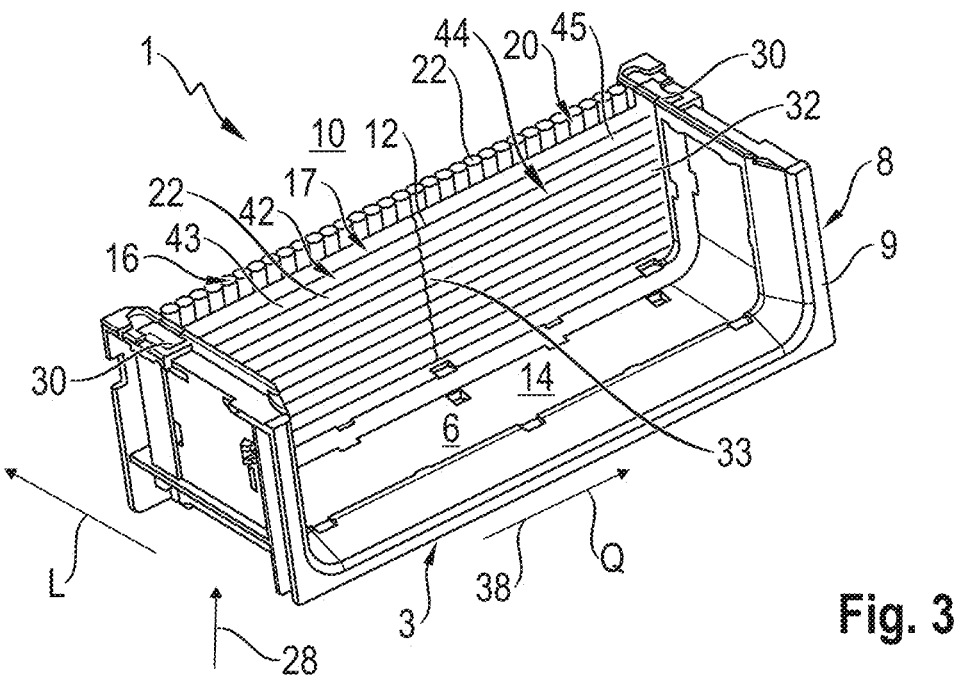
FIG. 3 is a perspective view of a section of the part of the device according to FIG. 2.
Figure 4:
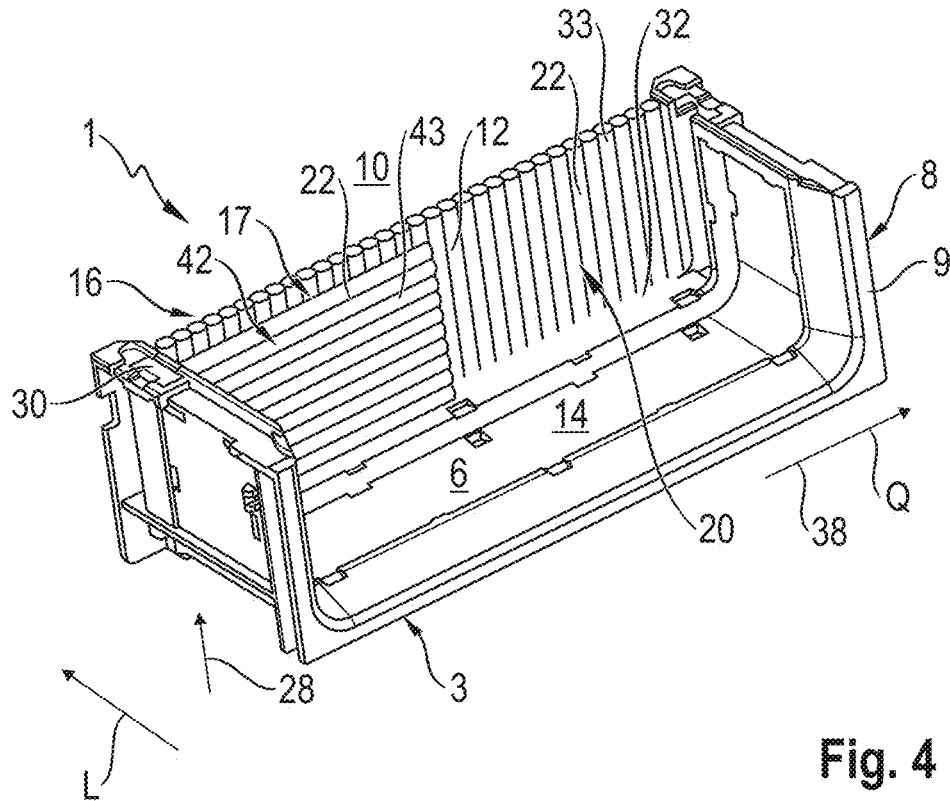
FIG. 4 is a three-dimensional view of the part of the device according to FIG. 3, a sealing arrangement being only partially visible.
Figure 5:
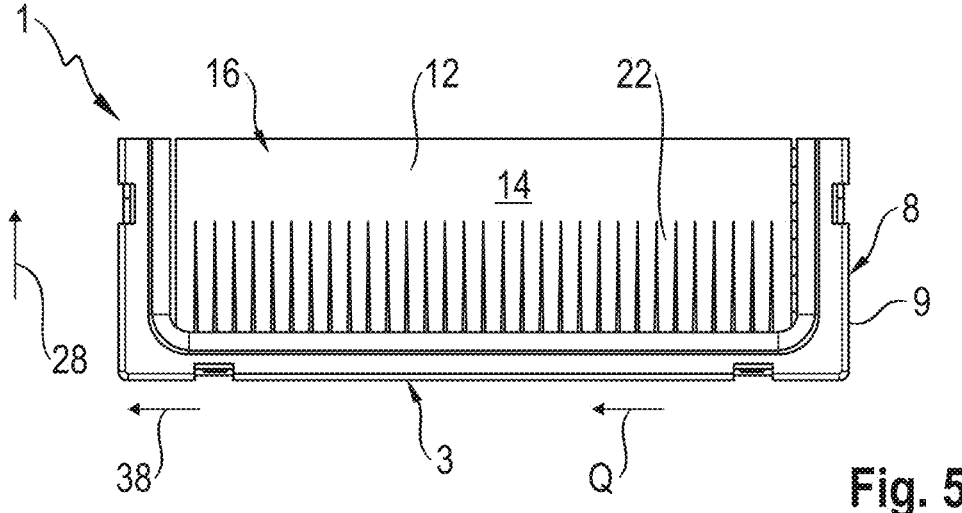
FIG. 5 is a plan view of the part of the device according to FIG. 3 in the longitudinal direction of the device.

In the present case, the device 1 is designed with two parts 3, 4, each having a substantially U-shaped cross section, which parts can be detachably arranged on one another according to FIG. 1. In the interconnected state of the parts 3, 4, the device 1 forms an axial passage channel 6 extending in the longitudinal direction L, which passage channel extends from a first axial end 10 to a second axial end 11 and at least in the region of the ends 10, 11 has a continuous opening 12, 13 for lines or the like.

In alternative designs, the device can also be made in one piece.

The device 1 has a housing 8 having a housing wall 9, the housing wall forming the axial passage channel 6 and delimiting an interior space 14 of the device 1. In the present case, the housing 8 has a substantially rectangular cross section, but in the case of alternative designs it can in principle be designed as desired and, for example, have a circular, oval, square, polygonal, or similar cross section.

In the region of the ends 10, 11, a first sealing arrangement 16 or 16' and a second sealing arrangement 17 or 17' are arranged in each case, the first sealing arrangement 16 being arranged on a side of the second sealing arrangement 17 facing the first end 10, and the first sealing arrangement 16' being arranged on a side of the second sealing arrangement 17' facing the second end 11. The sealing arrangements 16 and 16' or 17 and 17' are each constructed substantially identically, so that reference is made to the following description of the sealing arrangements 16 and 17 with regard to the construction of the sealing arrangements 16' and 17'.

The first sealing arrangement 16 and the second sealing arrangement 17 in the present case form a first sealing plane 24 and a second sealing plane 25, the sealing planes 24 and 25 being arranged in the present case substantially perpendicular to the longitudinal direction L in a transverse plane E. The first sealing plane 24 and the second sealing plane 25 are arranged substantially parallel to one another and have a distance A from one another in the longitudinal direction L, which distance is preferably selected to be as small as possible. The arrangement of the sealing arrangements 16 and 17 with respect to one another is shown in FIG. 8.

Figures 8, 9, 10, 11:
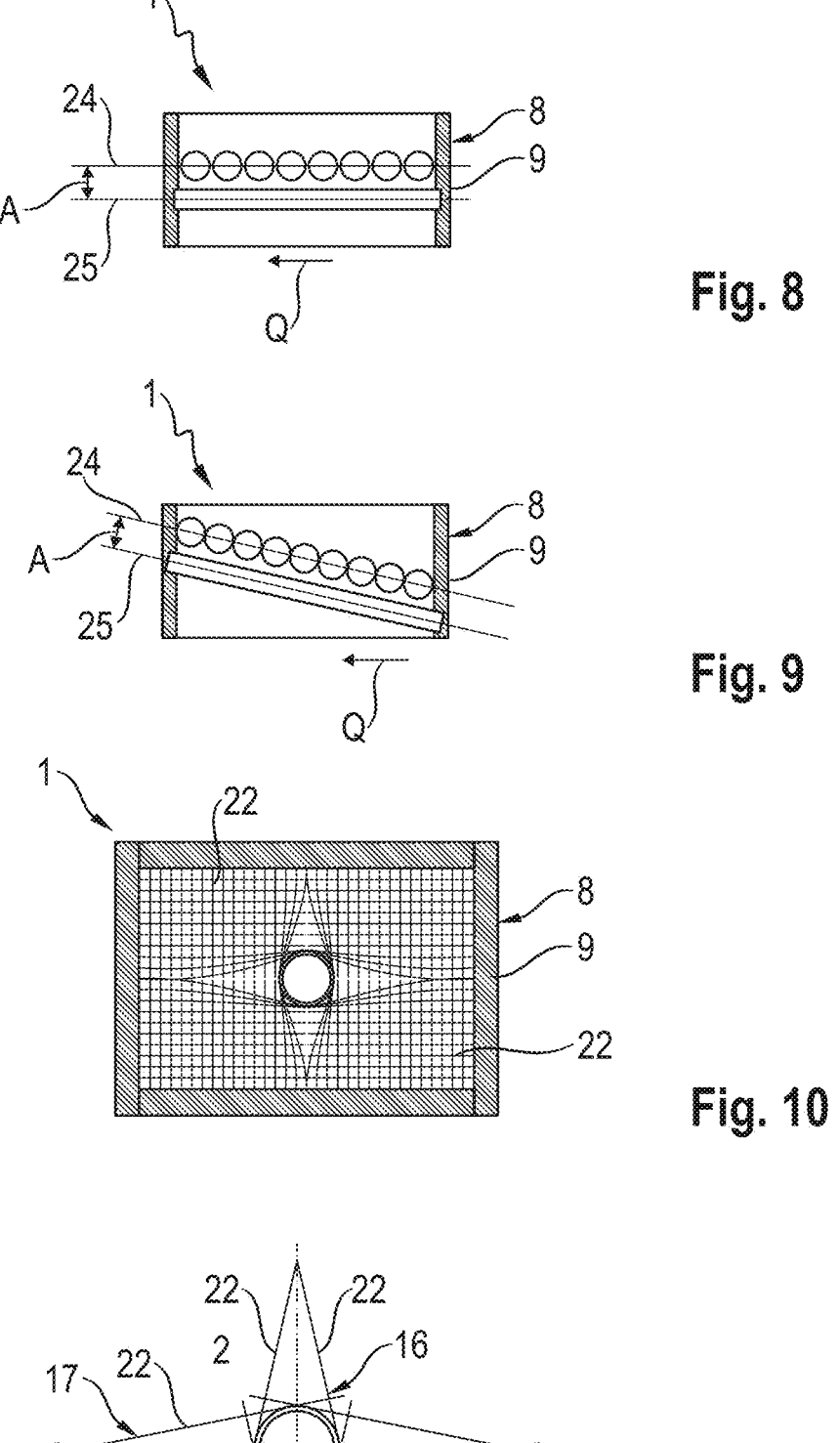
FIG. 8 is a greatly simplified view of the device for routing lines, pipes, and/or cables through a building part according to FIG. 1 to 5 having two sealing arrangements.
FIG. 9 is a greatly simplified view of an alternatively designed device for routing lines, pipes, and/or cables through a building part having two sealing arrangements.
FIG. 10 is a schematic view of a device for routing lines, pipes, and/or cables through a building part having a line routed through the device.
FIG. 11 is a schematic view of a section of the device according to FIG. 10

FIG. 9 shows an alternative embodiment to this, in which the first sealing arrangement 16 and the second sealing arrangement 17 are also arranged substantially parallel to one another. However, the first sealing plane 24 and the second sealing plane 25 each have an angle 48 with respect to the transverse plane E, so that the first sealing plane 24 and the second sealing plane 25 are not perpendicular to the longitudinal direction L. Thereby, simplified routing of a line, a pipe, a cable, or the like through the device 1 is achieved.

In the present case, the sealing arrangement 16 has two sealing structures 20 and 21, the first sealing structure 20 being arranged on the first part 3 of the device 1, and the second sealing structure 21 being arranged on the second part 4 of the device 1. In the assembled state of the device 1, the sealing structures 20 and 21 are thus arranged on opposite regions of the housing wall 9.

In the embodiment shown, the sealing structures 20 and 21 have in the unloaded state of the device 1, i.e. in a state in which no line or the like is routed through the device 1, directly adjacent, elongated sealing elements 22 which extend substantially in a first main direction 28 arranged substantially perpendicular to the longitudinal direction L.

The sealing elements 22 in the present case have a substantially circular cross section, in the present case are designed to be flexible and resilient, and have an extension in the first main direction 28 that is many times greater than an extension transversely to the first main direction 28. The extension of the sealing elements 22 transversely to the first main direction 28 is also advantageously many times smaller than a cross-sectional extension of a line routed through the device 1.

It can be provided that the sealing elements 22 have a rectangular cross section, so that adjacent sealing elements 22 rest against one another with their side surfaces in order to achieve an impermeability also with respect to a passage between the sealing elements 22.

The sealing elements 22 are designed in this case as resilient lamellas with a plastics fiber made of polypropylene or polyethylene, but in alternative designs they can also be designed as brushes, bristles, strips, tapes, hose elements, or the like and have other materials such as metal, rubber, biological materials, or the like.

The sealing elements 22 can also be made with woven fabric, scrims, or paper materials, which are flexible, can be applied snugly to a shell surface of a line or the like routed through the device 1, and, if possible, exert a resilient force on the shell surface in order to ensure the tightest possible seal in the region around the shell surface of the line. The sealing elements 22 can furthermore have an intumescent material and for example be coated with an intumescent material or enclose an intumescent material and in particular comprise a paper provided with intumescent material.

In order to achieve an improved sealing of the sealing arrangement 16 with respect to a line or the like routed through the device 1, the sealing elements 22 can be designed with a resilience that changes in the first main direction 28, so that, at their first end 32 which can be fixed on the housing wall 9, the material of the sealing elements 22 has a lower resilience than at the second end 33 of the sealing elements 22. In other words, the rigidity of the sealing elements 22 decreases starting from the first end 32 in the direction of the second end 33. Thus, a line or the like routed through the device 1 deforms the sealing elements 22 substantially directly in the region of the lateral surface of the line, the portion of the sealing elements 22 deflected by the line then resting particularly favorably on the lateral surface of the line. This allows for a particularly good seal against fire gases and smoke and ensures good opaqueness.

A first end 32 of the sealing elements 22 can each be brought into operative connection with the housing wall 9, the sealing elements 22 for this purpose each being able to be arranged individually directly on the housing wall 9 or being able to be arranged jointly on an in particular rail-shaped connecting element 30 which, for example, can be plugged or clipped into the housing wall 9.

The sealing elements 22 extend, starting from the first end 32 which can be fixed on the housing side, substantially in the first main direction 28 in the direction of a second end 33. The respective second ends 33 of the sealing elements 22 opposite the first end 32 form a common sealing line 35, 36 extending in a transverse direction Q arranged perpendicular to the longitudinal direction L, the second ends 33 of the sealing elements 22 of the first sealing structure 20 being the first sealing line 35, and the second ends 33 of the sealing elements 22 of the second sealing structure 21 forming the second sealing line 36.

In the present case, all sealing elements 22 have a substantially identical length in the first main direction 28, so that the first sealing line 35 and the second sealing line 36 in the unloaded state of the device 1 rest against one another in an approximately central region with respect to the first main direction 28, or the sealing elements 22 of the first sealing structure 20 stand on the sealing elements 22 of the second sealing structure 21. In this way, the passage of fire gases and smoke through the opening 12 can be effectively prevented and good opaqueness is ensured.

As an alternative thereto, it can also be provided that sealing elements of a sealing structure have lengths facing away from one another in the main direction, and sealing elements of the sealing structures of a sealing arrangement intermesh in a comb-like manner in the unloaded state of the device.

The second sealing arrangement 17 is constructed substantially comparable to the first sealing arrangement 16, solely the differences being discussed below and reference otherwise being made to the explanations relating to the sealing arrangement 16.

In the unloaded state of the device 1, sealing elements 22 of the second sealing arrangement 17 extend in a second main direction 38 which in this case is arranged perpendicular to the longitudinal direction L and in the present case extends substantially in the transverse direction Q.

In the present case, the transverse direction Q is understood to mean a direction that is defined by the division of the device 1 and is perpendicular to the longitudinal direction L.

The first main direction 28 of the first sealing arrangement 16 and the second main direction 38 of the second sealing arrangement 17 differ from one another with respect to the transverse plane E which is perpendicular to the longitudinal direction L. In the present case, the first main direction 28 and the second main direction 38 enclose an angle 40 of substantially 90° to one another.

In alternative designs, in particular with, for example, circular housing cross sections, the angle 40 can also deviate from 90° and, for example, have a value between 10° and 170°.

In contrast to the first sealing arrangement 16, a first sealing structure 42 of the second sealing arrangement 17 is designed in two parts and has a first part 43 and a second part (not shown in more detail). The first part 43 of the first sealing structure 42 is connected in the manner described in more detail above to the housing wall 9 of the first part 3 of the device 1, and the second part of the first sealing structure 42 is connected to the housing wall 9 of the second part 4 of the device 1, so that, in the assembled state of the device 1, sealing elements 22 of the first part 43 of the first sealing structure 42 together with sealing elements 22 of the second part of the first sealing structure 42 are designed comparable to the sealing structure 20 or 21, but are rotated relative thereto.

Likewise, a second sealing structure 44 of the second sealing arrangement 17 is designed in two parts and has a first part 45 and a second part (not shown in more detail). The first part 45 of the second sealing structure 44 is in turn connected in the manner described in more detail above to the housing wall 9 of the first part 3 of the device 1, and the second part of the second sealing structure 44 is connected to the housing wall 9 of the second part 4 of the device 1, so that, in the assembled state of the device 1, sealing elements 22 of the first part 45 of the second sealing structure 44 together with sealing elements 22 of the second part of the second sealing structure 44 are arranged in a comparable but rotated manner relative to the sealing elements 22 of the sealing structures 20 and 21 of the first sealing arrangement 16.

The sealing elements 22 of the second sealing arrangement are preferably each connected directly to the housing wall 9 in a known manner.

If a line, a pipe, a cable, or the like is routed through the device 1, the sealing elements 22 of the sealing structures 20 and 21 of the first sealing arrangement 16 are displaced in particular transversely to the longitudinal direction L and transversely to the first main direction 28. Analogously thereto, the sealing elements 22 of the sealing structures 42 and 44 of the second sealing arrangement 17 are in particular also displaced transversely to the longitudinal direction L and transversely to the second main direction 38, so that the sealing elements 22 of the first sealing arrangement 16 and the sealing elements 22 of the second sealing arrangement 17 can take a course shown in FIG. 10 and FIG. 11 in a simplified manner in the case of a line 2 routed through the device 1.

Through the line 2, the sealing elements 22 or the second ends 33 of the sealing elements 22 are bent over in such a way that they rest against a shell surface 5 of the line and thereby seal against the passage of fire gases and smoke and also achieve a specific opaqueness. In order to achieve a desired seal, the width of the sealing elements 22 transversely to the longitudinal direction L should be significantly smaller than the diameter of the line 2 or a dimension of the line 2 in the transverse direction; preferably, a width of the sealing elements 22 transversely to the longitudinal direction L is smaller by a factor of 5, in particular by a factor of 10, than the diameter of the line 2 or the dimension of the line 2 in the transverse direction. The width or thickness of the sealing elements 22 in the longitudinal direction L is preferably between 0.5 mm and 5 mm, preferably between 1 mm and 3 mm.

As can also be seen in FIGS. 10 and 11, the sealing elements 22 of the respective sealing arrangements 16 and 17 each have a lens-shaped opening when the device 1 is in the loaded state with the line 2, the lens-shaped openings of the sealing arrangements 16 and 17 being in this case correspondingly rotated by 90° with respect to one another through the main directions 28 and 38. As a result, a free cross-sectional surface viewed in the longitudinal direction L, i.e. a surface that is not covered by the line 2 or the sealing elements 22 of the sealing structures 20 and 21, is particularly small.

This can be seen in particular from FIG. 11, in which the sealing elements 22 are only movable in the region of their connection to the housing wall 9 and rest tangentially against the line 2. Sealing elements, which are designed to be resilient, lie in particular in an arc on the line 2, and the free cross-sectional surface can be further reduced.

A particularly good seal against fire gases and smoke and a particularly favorable opaqueness or optical seal is achieved by arranging the sealing arrangements 16' and 17' at the second end 11 of the device 1. The main directions 28 and 38 of the sealing arrangements 16' and 17' corresponding in the present case to the main directions 28 and 38 of the sealing arrangements 16 and 17 can also be rotated with respect to these, however, in particular in the case of devices having, for example, a circular cross section.

Figure 6:
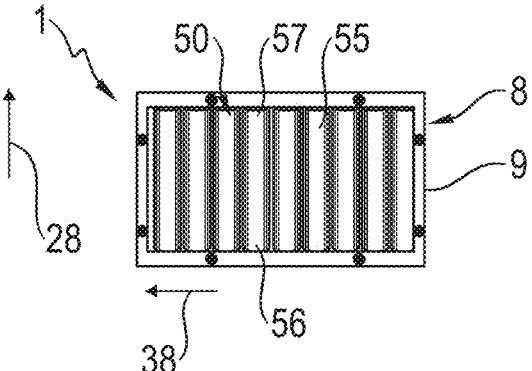
FIG. 6 is an alternative embodiment of a device for routing lines, pipes, and/or cables through a building part.
Figure 7:
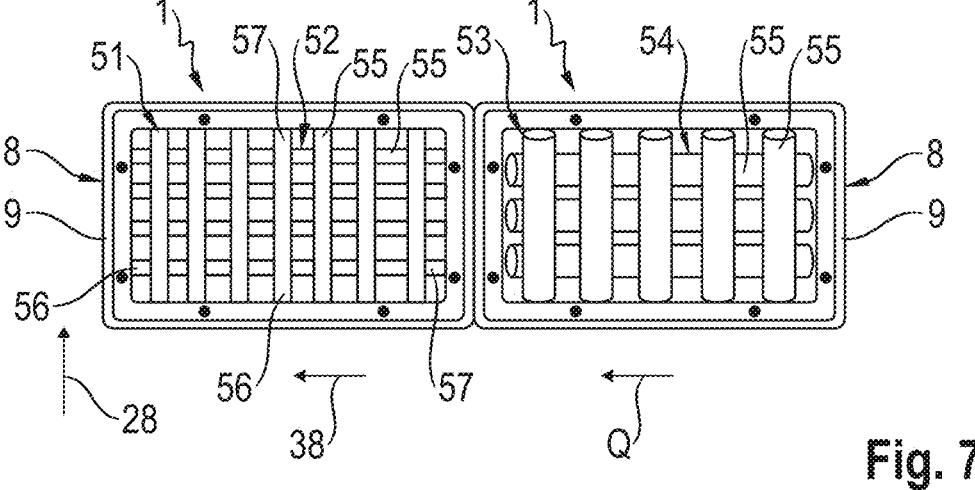
FIG. 7 is further alternative embodiments of devices for routing lines, pipes, and/or cables through a building part.

Alternative embodiments of sealing arrangements are shown in FIGS. 6 and 7. In contrast to the embodiment shown in FIG. 1 to 5, the sealing arrangements 50, 51, 52, 53, 54 according to FIG. 6 and FIG. 7 each have sealing elements 55 arranged both with their first end 56 and with their second end 57 on the housing side. Comparable to the embodiment according to FIG. 1 to 5, two sealing arrangements 50 or 51 and 52 or 53, and 54 are again provided, the sealing elements 55 of which have an angle to one another of, in the present case, in particular substantially 90°.

With these designs, in particular a good sealing and opaqueness can be achieved when routing a large number of lines, cables, pipes, or the like through the device.

The invention claimed is:

1. A device for routing lines, pipes, and/or cables through a building part, comprising:
   a housing having a housing wall,
   wherein the housing has an axial passage channel that is delimited by the housing wall and extends in a longitudinal direction and has in each case one opening at opposite ends,
   wherein at least two sealing arrangements are each provided in an interior of the housing, and which are designed for sealing each opening in the axial passage channel,
   wherein said at least two sealing arrangements comprise a first sealing surface having a plurality of sealing elements that are elongated, which extend in a first main direction, and are adjacent to one another, and a second sealing surface having a plurality of sealing elements that are elongated, which extend in a second main direction, and are adjacent to one another,
   wherein the at least two sealing arrangements are each connected to the housing wall by a rail-shaped connecting element that receives the respective sealing arrangement and is configured to be plugged or clipped into the housing wall, thereby securing the sealing arrangements within the housing
   wherein the first main direction and the second main direction differ from one another with respect to a transverse plane perpendicular to the longitudinal direction,
   wherein said first sealing surface and said second sealing surface are configured to inhibit fire gases, smoke and/or light, and
   wherein the first and second sealing surfaces are spaced apart in the longitudinal direction, and, in a loaded state with a line, pipe, or cable routed through the device, the sealing elements of the first and second sealing surfaces form respective lens-shaped openings that are rotated relative to one another so that, when viewed in the longitudinal direction, a cross-sectional area of the passage channel not covered by the line, pipe, or cable and the sealing elements is minimized.

2. The device according to claim 1, wherein the first main direction and the second main direction together enclose an angle between 10 degrees and 170 degrees, with respect to the transverse plane perpendicular to the longitudinal direction.

3. The device according to claim 1, wherein the first sealing surface and/or the second sealing surface are each substantially a sealing plane.

4. The device according to claim 3, wherein the first sealing surface is a first sealing plane and the second sealing surface is a second sealing plane, and
   wherein the first sealing plane and/or the second sealing plane is arranged substantially perpendicular to the longitudinal direction.

5. The device according to claim 3, wherein the first sealing surface is a first sealing plane and the second sealing surface is a second sealing plane, and
   wherein the first sealing plane and/or the second sealing plane has an angle with respect to the longitudinal direction.

6. The device according to claim 3, wherein the first sealing surface is a first sealing plane and the second sealing surface is a second sealing plane, and
   wherein the first sealing plane and the second sealing plane are arranged substantially parallel to one another.

7. The device according to claim 1, wherein the at least two sealing arrangements are arranged in a region of one end of the housing.

8. The device according to claim 1, wherein at least one sealing arrangement of the at least two sealing arrangements has at least two sealing structures,
   wherein at least one of the at least two sealing structures has a plurality of sealing elements which are elongated, extend in a corresponding main direction, and are adjacent to one another.

9. The device according to claim 8, wherein the sealing elements of the at least two sealing structures substantially form a common sealing line.

10. The device according to claim 1, wherein sealing elements of at least one of the at least two sealing arrangements are arranged on both sides of the housing wall.

11. The device according to claim 1, wherein the sealing elements are designed as lamellas, brushes, bristles, strips, tapes, or hose elements.

12. The device according to claim 1, wherein the sealing elements are made of metal, plastic material, rubber, and/or biological material.

13. The device according to claim 1, wherein the housing has a circular, oval, rectangular, or square cross-sectional surface.

14. The device according to claim 1, wherein the housing is designed in two parts at least in a longitudinal plane.

15. The device according to claim 1, wherein at least one sealing arrangement of the at least two sealing arrangements has an intumescent material.

16. The device according to claim 2, wherein the first main direction and the second main direction together enclose an angle of substantially 90 degrees, with respect to the transverse plane perpendicular to the longitudinal direction.

17. The device according to claim 8, wherein the at least two sealing structures each have a plurality of sealing elements which are elongated, extend in a corresponding main direction, and are adjacent to one another.

18. The device according to claim 7, wherein two further sealing arrangements are arranged in a region of an opposite end of the housing.

19. The device according to claim 15, wherein the intumescent material is provided at least in the sealing elements of the first and/or second sealing surface, the sealing elements being elongated and arranged in the respective first and second main directions, and configured to expand upon exposure to heat to close the passage channel.

20. A device for routing one or more lines, pipes, or cables through a building part, comprising:
   a housing defining a passage channel that extends in a longitudinal direction;
   the housing comprising an upper housing half and a lower housing half, each having a substantially U-shaped cross-section, the upper and lower housing halves being detachably connected to one another along longitudinal side edges thereof;
   the housing having an upper wall, a lower wall, a left wall, and a right wall that together form the passage channel, and having a first end opening and a second end opening located opposite one another along the longitudinal direction;

each of the first and second end openings receiving an upper sealing arrangement and a lower sealing arrangement, the upper sealing arrangement being positioned adjacent to the upper wall of the upper housing half and the lower sealing arrangement being positioned adjacent to the lower wall of the lower housing half of the respective first and second end openings;

each sealing arrangement including a first sealing surface comprising a plurality of elongated sealing elements extending in a vertical direction in the passage channel and a second sealing surface comprising a plurality of elongated sealing elements extending in a horizontal direction in the passage channel, the vertical and horizontal sealing elements being oriented substantially 90 degrees with respect to one another about a transverse plane perpendicular to the longitudinal direction;

wherein the sealing elements extending in the horizontal direction extend from the left and right walls of the housing up to a central region, and the sealing elements extending in the vertical direction extend from the upper and lower walls of the housing up to the central region, the sealing elements from opposite sides being unconnected and meeting in mutual proximity at the central region;

wherein each elongated sealing element has a stiffness that decreases from a region of connection to its respective housing wall toward its free end located near the central region;

wherein the first and second sealing surfaces of each sealing arrangement are spaced apart in the longitudinal direction and lie in non-intersecting planes; and wherein each of the upper and lower sealing arrangements is connected to the housing by a rail-shaped connecting element that receives the respective sealing arrangement and is configured to be plugged or clipped into the respective longitudinal edge of the housing, thereby securing the sealing arrangements within the housing.

* * * * *